Dec. 8, 1970  W. H. ROSS  3,546,054
SPLICED CONVEYOR BELT AND METHOD OF MAKING SAME
Filed June 20, 1968

Inventor
William H. Ross
By Darby, Robertson & Vandenburgh
Attorneys

United States Patent Office 3,546,054
Patented Dec. 8, 1970

3,546,054
SPLICED CONVEYOR BELT AND METHOD OF MAKING SAME
William H. Ross, P.O. Box 54,
Glenwood, Ill. 60425
Filed June 20, 1968, Ser. No. 738,430
Int. Cl. B32b 7/08
U.S. Cl. 161—38          11 Claims

ABSTRACT OF THE DISCLOSURE

Belts are spliced by removing surface portions on both sides of the belting near the ends to be joined, pre-stressing the cord-laced splice and embedding the joint to the original surface of the belting in a tough resin to hold the lacing cord and protect it from wear and to moisture-proof the joint.

---

This invention relates to the art of splicing belts; e.g., conveyor or power belts made of belting material having a cord core and covering of rubber or rubber-like material. It also relates to such spliced belting material articles.

Belts have been spliced in a variety of ways to attain certain advantages and to overcome certain disadvantages. For example, it is desirable to provide a simple but strong splice which will hold up under service conditions and to provide a splice which does not form a bump on the belt. Thickness at the splice greater than the thickness of the belt is objectionable for several reasons among which may be included an increased likelihood of wear, interference with the conveying operation of the belt, and unnecessary noise.

Industrial conveyor belts are frequently spliced by inserting splicing clips between the butt ends of the terminating belt portions. Because they are raised relative to the belt surface, such splices wear out and fail in relatively short times. Similar problems are expected with similar or equivalent fastening means such as stitching or lacing which may be used to form a butt joint at the terminating end portions of the belting matreial or the like. The use of adhesives or similar bonding agents is not satisfactory, especially to meet the high service demands of industrial conveyor belts.

One primary object of the present invention is to provide an improved method whereby terminating portions of belting material or the like may be effectively spliced in relatively simple process steps so that the spliced belts may be used in ordinary service without undesirably early wear or breakdown.

Another object of the invention is a method for effectively splicing terminating portions of belt material or the like without incurring raised portions at the splice zone which is an objectionable feature of former splicing methods.

Still another object of the invention is an effective method for splicing belts to obtain a splice which is comparable in flexibility to the flexibility of the belting material.

Yet another object is to provide a method for splicing belting, which method utilizes the strength of a cord-laced joint and protects and augments the strength of the cord by embedding the lacing in a tough resin which also results in a splice zone of normal flexibility and thickness.

The foregoing and other objects are attained by the methods of the invention as hereinafter described in conjunction with the accompanying drawings wherein.

The following description will make particular reference to industrial conveyor belting, but it should be understood that equivalent materials may be spliced in an equivalent way to obtain the advantages of the invention.

Figure 1:
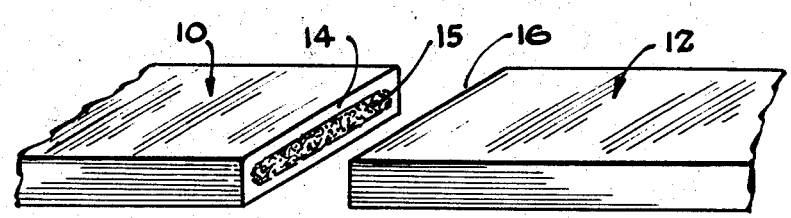
FIG. 1 is a more or less schematic perspective view showing the ends of a belt to be spliced together.
Figure 2:
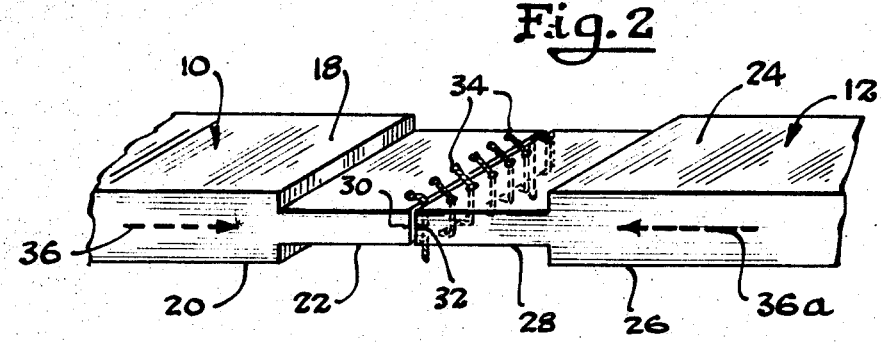
FIG. 2 is a more or less schematic perspective view showing the end potrions of the belt prepared for splicing and laced together with cord.

The end portions 10 and 12 of a belt to be spliced together are shown in FIG. 1. Frayed material is cut away to provide sound opposing end faces 14 and 16. The belting materials shown are intended to depict the industrial rubber conveyor belts with cord cores 15, as indicated, of cotton or nylon, bound together and covered with a layer of synthetic or natural rubber.

The splicing process is initiated by removing surface layers from the top 18 and the bottom 20 of belt end portion 10, resulting in a body section of reduced thickness. The rubber coatings and, if necessary, sufficient of the cord core are cut or abraded away to a depth slightly greater than the diameter of the cord to be used for lacing the ends together so that body section 22, comprising the intact core of the belt, resembles a tongue projecting from about the middle of end portion 10. Similarly, surface layers are removed from the top 24 and the bottom 26 of end portion 12, resulting in projecting body section 28 which is equivalent in thickness and positioning to body section 22.

The ends 30 and 32 of core body sections 22 and 28 are arranged to form a butt joint and are laced together. The lacing step may be effected by punching or, preferably, piercing holes in the core body sections and stitching the belt ends together using a very strong cord 34, preferably a cord of synthetic material, such as nylon, of about 250 lb. test. If the belt is being spliced in place on conveyor or other apparatus, it will probably be necessary to provide means for urging the end portions toward each other as indicated by the arrows 36 and 36a. It is not necessary, however, nor even desirable, that the adjoining ends of the belt be in contact with each other.

The laced butt ends of the core sections 22 and 28 define an upper trough or channel 38 above, and a lower trough or channel 40 below, the core sections. The next step of the process provides that these troughs or channels be filled with a resin material which cures into a flexible body to cover and grip the lacing cord 34 and to restore the splice zone to substantially the original thickness of the belt.

Figure 3:
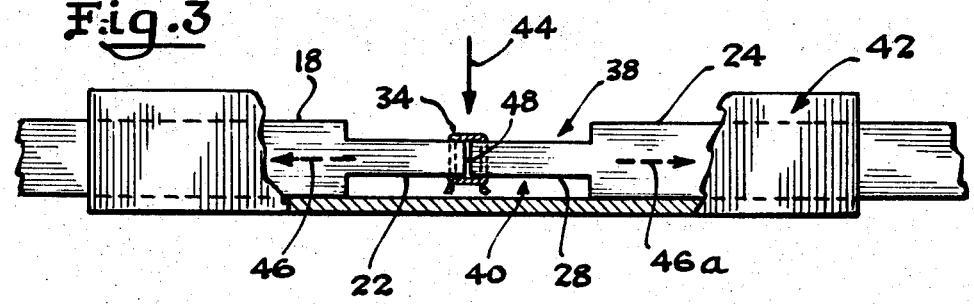
FIG. 3 is a more or less schematic side elevational view of the laced belt ends disposed in a mold form in preparation for receiving a charge of resin.
Figure 4:
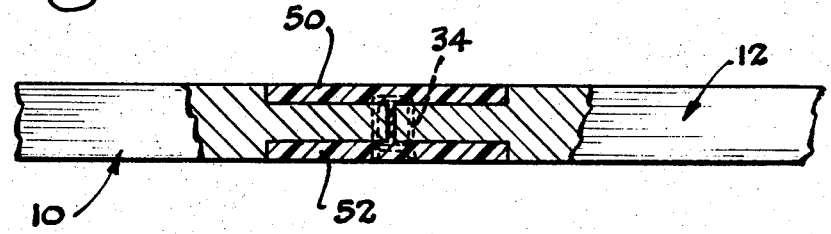
FIG. 4 is a more or less schematic side elevational view, partly in section, showing the completed splice.

The procedure for filling these troughs or channels is indicated in FIG. 3. If desired, the surfaces defining the channels may be roughened to enhance the bonding of the resin material to the belting material, but this is generally not necessary since the resins preferably employed readily and permanently bond with the rubber or rubber-like material of the belting. The end portions of the belt, including the entire laced butt joint section, are positioned within a mold or form 42 which is open at its top to receive the resin. Using suitable apparatus, the respective ends of the belt are urged away from each other, as indicated by the arrows 46 and 46a, to effect the uniform distribution of stress in the lacing cord 34 and prestress this cord. A charge of fluid resin is deposited, as indicated by arrow 44, into form 42 and channel 38. Some of this charge flows through gap 48 to fill channel 40 and gap 48, itself. Sufficient resin is supplied to bring the level to that of surfaces 18 and 24 of the belt. The resin is then permitted to cure, the forces applied to prestress the lacing cord 34 preferably being maintained during the curing process.

The resin charge is preferably a resin system which contains a room temperature curing catalyst so that the deposited resin may cure into a body having approximately the same flexibility as that of the belting itself. A preferred resin system is the urethane system which contains a room temperature curing catalyst such as a tin or amine catalyst. Such systems are well known in the art and are prepared from conventional isocyanates or polyisocyanates, polyols and catalysts. A useful isocyanate is TDI (tolylene diisocyanate). The polyol or hydroxyl bearing materials include various polyethers, polyesters, glycerols or other addition agents such as sorbitol and pentaerythritol.

The further identification and properties of such resins will not be discussed since they are well known in the art and do not comprise, as such, the invention. It is desirable to provide a plastic resin material which is tough and abrasion resistant, is at least as flexible as the belting, and will bond strongly to the lacing cord and to the belting body. The cured bodies 50, 52 of resin become a part of the belt structure, protecting the lacing 34 from wear and sealing the covered surfaces of the belting against moisture.

It is usually desirable to accelerate the curing of the resin by heating the deposited charge, as by means of infra red lamps. In this way, the curing time of the resin may be greatly reduced. For example, a deposited urethane system may require up to 8 hours to effectively cure into a flexible plastic body at room temperature, whereas with heating the curing time may be reduced to about 1 hour.

While the urethane plastic system has been described as preferred, other equivalent flexible plastic systems may be employed such as the epoxy which is preferably rendered flexible by incorporating polysulfides. Silicons rubber resins may also be employed, if desired. As mentioned, the urethane resin system is particularly well adapted for this application because it cures into an elestomeric body and possesses excellent abrasion resistance which allows the spliced zone to hold up exceptionally well in use.

The invention may now be practiced in the various ways to practitioners, and such practice will be a part of the invention so long as it comes within the terms of the appended claims as given further meaning by the language of the preceding specification.

I claim:
1. A method for splicing a belt which includes the steps of
   removing top and bottom surface portions of the end portions of both ends of the belt to be spliced together,
   positioning the ends of the belt in substantially abutting relationship,
   lacing the ends together with lacing cord,
   urging the end portions apart to effect substantially uniform distribution of tensile stress in the lacing cord, and
   depositing a charge of resin in liquid state upon both sides of the end portion of the belt to embed the laced joint therein and restore the normal thickness of the belt,
   said resin being bondable to the belt body and to the lacing cord and curable to a flexible solid state.
2. The method of claim 1 wherein the thickness of each of the top and bottom surface portions removed from the end portions of the belt is greater than the diameter of the lacing cord.

3. The method of claim 1 and including the step of placing the end portions in a mold form to contain the resin and form it into a body which substantially restores the end portions of the belt to the normal transverse dimensions of the belt.

4. The method of claim 1 wherein the forces urging the end portions apart are maintained throughout the resin curing period to prestress the lacing cord and effect the bonding of the resin to the lacing cord while the cord is in prestressed condition.

5. The method of claim 4 wherein the ends are so laced and such force is applied to urge the laced end portions apart that a gap is provided between adjoining ends of the belt and said gap is filled with the resin.

6. The method of claim 1 inclduing the step of providing lacing holes in the end portions of each end of the belt prior to the lacing step.

7. The method of claim 6 wherein the lacing holes are made by piercing the bodies of the end portions of the belt.

8. The method of claim 1 wherein the resin is a urethane system curable at room temperature.

9. A spliced belt which includes
   a spliced zone including the spliced end portions of the belt,
   said end portions being median portions of the belt thinner than the normal thickness of the belt,
   a cord lacing holding the ends of said end portions together,
   said median portions being thinner than the normal thickness of said belt by an amount equal to twice the diameter of the cord of said lacing, and
   a body of resin covering said end portions of said belt and said cord lacing and of such dimensions as to restore the spliced zone to the normal thickness of said belt,
   said body of resin being flexible and bonded to the belt and to said cord lacing.

10. A spliced belt in accordance with claim 9 wherein the resin is a urethane system.

11. A spliced belt in accordance with claim 9 wherein the cord of the cord lacing is in prestressed condition.

References Cited

UNITED STATES PATENTS

| 1,635,185 | 7/1927 | Kimmich | 24—38 |
| 1,326,264 | 12/1919 | Hill | 24—38X |
| 1,735,686 | 11/1929 | Kimmich | 24—38 |
| 539,145 | 5/1895 | Robins | 156—160X |

FOREIGN PATENTS

| 953,208 | 3/1964 | Great Britain | 198—193 |

PHILIP DIER, Primary Examiner

U.S. Cl. X.R.

24—38; 74—231; 156—93, 159, 161, 137; 161—52; 198—193; 264—263